(12) United States Patent
Twining

(10) Patent No.: US 6,222,449 B1
(45) Date of Patent: Apr. 24, 2001

(54) REMOTE FISH LOGGING UNIT

(76) Inventor: Ronald F. Twining, 3214 Cherry Forest Dr., Houston, TX (US) 70088

( * ) Notice: Subject to any disclaimer, the term of this patent is extended or adjusted under 35 U.S.C. 154(b) by 0 days.

(21) Appl. No.: 08/897,196

(22) Filed: Jul. 21, 1997

(51) Int. Cl.[7] ...................................................... G08B 1/08
(52) U.S. Cl. .................. 340/539; 340/573.2; 340/825.3; 707/102
(58) Field of Search .................................. 340/539, 573.2, 340/691.6, 825.3, 286.02; 707/201, 200, 102, 104

(56) References Cited

U.S. PATENT DOCUMENTS

| | | | | |
|---|---|---|---|---|
| 5,136,285 | * | 8/1992 | Okuyama | 340/870.11 |
| 5,461,365 | * | 10/1995 | Schlager et al. | 340/573 |
| 5,778,882 | * | 7/1998 | Raymond et al. | 128/700 |
| 6,052,693 | * | 4/2000 | Smith et al. | 707/104 |
| 6,057,758 | * | 5/2000 | Dempsey et al. | 340/539 |

* cited by examiner

*Primary Examiner*—Daryl Pope
(74) *Attorney, Agent, or Firm*—Howrey Simon Arnold & White, LLP

(57) ABSTRACT

A portable recording device, namely a remote logging unit, for electronically recording relevant information related to fishing conditions, and the like. The recording device has sensors for detecting environmental conditions and/or for measuring physical data on a specimen caught. The device also includes input mechanisms, such as a touch screen, for manually entering information, and a display for reviewing information stored in the device's memory. The recording device may be connectable to a personal computer for creating a personal log of the user's activities and/or loading additional information into the device. The device may transfer recorded data to a central repository, for example using a transmitter/receiver for sending a data signal to a network server which maintains a database of information related to fishing conditions at a number of locations. The network server may receive and compile information from a number of remote units at various locations, thereby providing a system for sharing such information. A remote unit may contact the server from a remote location and request information on fishing conditions for a selected location.

9 Claims, 2 Drawing Sheets

REMOTE FISH LOGGING UNIT

FIELD OF THE INVENTION

The present invention relates generally to a system for electronically recording and exchanging information between a remote location and a central location, and more particularly to a remote logging device for electronically recording data relating to fishing conditions at a remote location and to a system for exchanging relevant information between such a remote device and a central repository.

BACKGROUND

In order to maximize their enjoyment and success at their sport, recreational fishing enthusiasts often would like to have information regarding fishing conditions in an area, especially before setting out on a fishing trip. For example, fishermen may consider trying something new, such as going to a new location, but may be reluctant to do so because of their inexperience with and lack of information regarding the new location. Thus, they may want to know, for example, at what locations fish are more actively biting, what species are likely to be encountered in an area, what bait is attracting more fish, at what depths fish are being caught, what environmental conditions may enhance the likelihood of a successful outing, and the like.

Often, however, only limited information is available and only in limited quantities or distribution. For example, word-of-mouth may provide some insight into fishing conditions in an area. However, such information may also involve "fish stories" with little accuracy or predictive value.

To improve the accuracy of information, some sports fishing enthusiasts may keep a personal log of their fishing activities. For example, they may maintain written records of their past experiences and successes to provide them with some insight into future conditions at locations where they have fished before. However, such written records may omit useful details or may include inaccurate information, particularly if the records are written after an outing. Past experiences in an area also may not always predict future encounters, particularly as conditions change with time. Further, because most logs are personal in nature, they may not be widely shared with others. Thus, individual fishermen, while having the benefit of their own logs, generally may not have the combined insight available if they could pool their knowledge and experiences with other fishing enthusiasts.

Accordingly, it is believed that a system for more accurately recording and sharing relevant information on fishing conditions, species populations, and/or natural resource demographic information would be useful.

SUMMARY OF THE INVENTION

The present invention is directed to a system for electronically recording and/or collecting relevant information on fishing, hunting and other conditions at a number of locations, and to a method of exchanging information between an individual and a central repository storing such information.

In a preferred embodiment in accordance with the present invention, a remote fish logging unit is provided for electronically recording information on fishing conditions at a particular location. The remote unit is a portable data gathering device that users may take along to a location where they fish. The remote unit includes a set of sensors for measuring relevant physical properties or environmental conditions, a storage device for temporarily storing data measured by the sensors, and a display, together allowing the user to measure, store, and/or review data of relevant conditions at the location when a fish or other specimen is caught. For example, the device may include a scale for weighing the fish, a retractable cable for measuring the length of the fish, atmospheric sensors for measuring air temperature and pressure, water sensors for measuring water temperature and pH, and a global positioning system (GPS) for providing an accurate longitude and latitude of the location. The remote unit may also include manual input mechanisms, such as a touch screen, an arrow pad, or keypad, for providing additional information related to the conditions of the catch.

The remote unit includes a central processor which receives signals from the sensors and measuring devices proportional to the properties being measured, converts the signals into corresponding data values, and temporarily stores the data in the remote unit's memory. As individual fish are caught, the remote unit may be operated in a concurrent mode to record each catch. The processor may be directed to store data measured by the sensors related to the physical properties of the fish and/or the environmental conditions at the time. The processor may also store the time, date and geographic location of the catch. Additional information related to the fishing conditions may be entered manually and stored along with the corresponding measured data. Alternatively, a summary of information related to a number of fish caught may be entered at one time, for example at the end of a day's fishing, by operating the remote unit in a batch mode.

Once data is recorded using the remote unit, it may be temporarily stored in the unit's memory and may be recovered later to create a personal log of the user's fishing activities, for example using a personal computer. Alternatively, the remote unit may be used to exchange information with a central repository, such as a network server, either through a connection with a personal computer or from its remote data-gathering location.

To accomplish remote data exchanging, the remote unit may include a transmitter which sends a signal including the data stored in the unit's memory. The signal is received by a base station or is otherwise relayed to a network server. The network server includes a processor which adds the data from the signal to a database on fishing conditions previously received from other remote units and stored in the server's memory. The information may be sorted in a variety of ways, such as by geographic location, allowing particular data to be extracted by subscribers to the network.

The remote unit may also be used to access data from the network server directly from its remote location. The transmitter in the remote unit may send a signal including a selected location for which the user wants information, for example his present location. The signal may be relayed to the network server, which extracts information for the selected location from its database. A signal then may be sent back to the remote unit including the extracted data, and a receiver in the remote unit may receive the signal. The processor may temporarily store the data from the signal in memory, allowing the user to review the information on the remote unit's display.

Accordingly, an object of the present invention is to provide a device for electronically collecting and recording data on fishing, hunting or other conditions at a remote location.

It is also an object to provide a system for storing and sharing information related to fishing conditions accumulated from individual fishing or hunting experiences.

It is still another object of the present invention to provide an improved system and method for tracking and/or managing migrational natural resources such as fish and game.

Other objects and features of the present invention will become apparent from consideration of the following description taken in conjunction with the accompanying drawings.

DETAILED DESCRIPTION OF THE PREFERRED EMBODIMENTS

In one innovative aspect, the present invention is directed to a portable data-gathering device, which users may take along to a location where they fish or hunt, and which may be used for electronically recording relevant information related to their activities and/or for exchanging relevant information with a central repository, such as a network server. A recording device in accordance with the present invention is generally a portable hand-held device having a casing that contains all of the unit's sensors and electronic components. The casing is preferably relatively small and lightweight such that the device may be held easily by a user, for example using only one hand. The casing may be manufactured from plastic, metal, composites or other materials capable of providing a substantially water proof seal and/or a durable package for protecting the internal components. In addition, the casing material itself, or one or more interior chambers within the casing, may provide sufficient buoyancy to allow the device to float, for example if it is accidentally dropped in water. If desired, the casing (or chambers therein) may be filled with an inert gas to impede corrosion and minimize fogging of any display screen(s).

The recording device may include one or more sensors, transducers or input mechanisms for measuring environmental conditions, specimen data and/or electronically recording information related to fishing condition from the user's remote location. The sensors may include conventional transducers capable of providing an output proportional to a physical property or condition being measured, preferably an electrical signal proportional to the property, as will be appreciated by those skilled in the art. The signals may be converted by processor circuitry in the recording device to provide a data value which may be stored temporarily in memory circuitry. The memory circuit may be part of the processor itself or may be provided as a discrete component within the recording device.

The recording device may also include one or more input mechanisms for manually recording additional conditions and data that the user may want to record, such as a touch screen, keypad, or the like, and may also include a display screen, such as a conventional LCD, LED, TFT, color diode or fluorescent screen. A processor may be connected to the input mechanisms and the display screen to provide an interface between the user and the recording device, as will be appreciated by those skilled in the art. For example, menus may be displayed on the screen, and the user may select options from the menus using the input mechanisms, for example to activate the recording device, to enter additional data, and/or to access data or information stored in the memory of the recording device.

Figure 1:
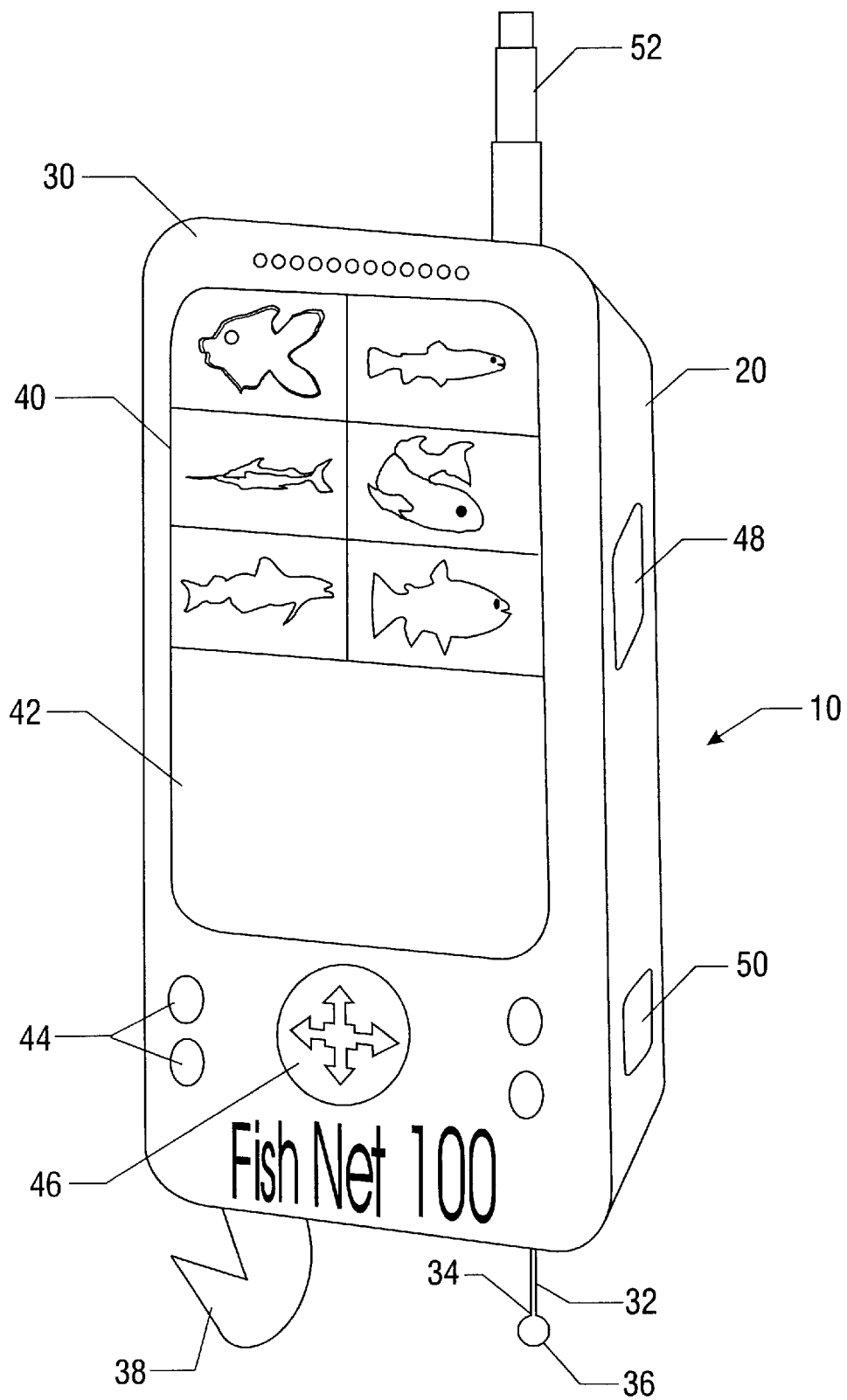
FIG. 1 is a perspective view of a remote unit in accordance with the present invention.

Turning now to the drawings, FIG. 1 shows a preferred embodiment of a remote fish logging unit 10 in accordance with the present invention. The remote unit 10 includes sensors 30 for measuring atmospheric conditions at the location, such as a thermocouple or thermometer for measuring air temperature and/or a barometer for measuring atmospheric pressure. The remote unit 10 also includes a probe 36 for measuring water conditions at the location, such as a thermocouple or thermometer for measuring temperature and/or a pH level detector. Preferably, the probe 36 is mounted on the end 34 of a retractable cable 32 that may be drawn out from the casing 20 to facilitate contact with a body of water at the location. For example, the cable 32 may be a long, substantially flexible wire wound inside the casing 20 on a spring-retractable spool (not shown), or the cable 32 may be a long telescoping member with the probe 36 located on its end. The cable 32 is pulled out of the casing 20, possibly automatically locking as a length is withdrawn, until a section of cable 32 is extended that allows the probe 36 to reach the water being measured. Alternatively, the cable 32 may be manually unwound from the casing, for example by an external handle (not shown) connected to the internal spool. After obtaining the desired data, the cable 32 is retracted, for example using a mechanical release and a biased spring for automatically retracting, or by manually rewinding the cable 32.

In addition, the remote unit 10 includes measuring devices for obtaining physical data on a fish or other specimen caught at the location, such as a scale 38 from which a fish (not shown) may be hung to measure its weight. In addition, a device for measuring the length of a fish may be included (not shown). For example, the cable 32 may include length demarcations proceeding incrementally from its end 34, such that a section of the cable 32 may be extended from the casing 20 to expose the demarcations and allow the length of a fish to be measured. The length may be measured automatically by the remote unit 10 based upon the length of the cable 32 extended, or the length may be observed visually by the user and input manually.

The remote unit 10 also includes a number of input mechanisms for manually entering information, such as a touch screen 40. The touch screen 40 has a preset menu from which the user may select options, or it may have a plurality of menus which may be selectively activated and accessed by the user. For example as shown, the touch screen 40 may include images of species of fish from which the user may select a species by pressing the appropriate portion of the touch screen 40. Alternatively, the available menus may include bait type used to catch a fish, depth at which a fish is caught, or other parameters which generally only have a limited number of selectable options.

The remote unit 10 also includes a control panel 44 for inputting additional data, and/or for controlling the operation of the remote unit 10. For example, the panel 44 may include an arrow pad 46 that allows the user to toggle between menus displayed on the screen 42, to enter additional data or comments, or to review information stored in the memory of the remote unit 10. In addition, the remote unit 10 includes an entry button 48 that may be depressed, for example by the user's thumb, to control the remote unit's processor, or to indicate to the processor to electronically record a property measured by a selected sensor.

Additional electronic components (not shown) are also contained within the casing 20 of the remote unit 10, such as processor circuitry, memory circuitry, a global positioning system (GPS), and possibly communications circuitry (cellular, VHF, shortwave etc.). The casing 20 also holds a power source (not shown), such as conventional replaceable or rechargeable batteries, for providing power to operate the remote unit 10.

For example, the remote unit 10 includes a processor (not shown) for receiving the signals from the sensors and measurement devices, and for converting each signal into a data value. The processor temporarily stores the values in memory (not shown). Clock circuitry may be provided, either as part of the processor or as a separate internal component, which the processor may access to store the time and date when data is recorded.

In addition, the remote unit 10 may also be provided with communications circuitry (not shown), which is also generally controlled by the processor, for transferring the recorded data to a mass memory storage device external of the remote unit 10. For example, a data port 50 is provided in the casing 20 for transferring data via a wire connection with the processor, such as between the unit's memory and a personal computer (not shown). Alternatively, wireless communication may be used to transfer data between the remote unit 10 and a network server (not shown), for example using a null modem, serial approach, wireless radio, or IR transfer techniques that are well known in the art. The remote unit 10 preferably includes a transmitter (not shown) for sending a data or inquiry signal to a base station which relays the data to the server, and/or a receiver (not shown) for receiving a data signal from the server, preferably using conventional cellular telecommunications. An antenna 52 is mounted on the casing 20 that is connected to the communications circuitry and/or the processor for transmitting and/or receiving signals between the remote unit 10 and the base station.

If provided with a transmitter/receiver, the remote unit 10 preferably also includes a global positioning system (GPS) for determining the specific geographic location of the user, as will be appreciated by those skilled in the art. Thus, the processor may request and store GPS data in the unit's memory when other data is recorded. Alternatively, the processor may direct the base station to determine the location of the remote unit 10 when data is relayed through the base station to the server.

When individual fish are caught, the operation of the remote unit 10 may proceed as follows, by operating the remote unit 10 in a concurrent mode. The remote unit 10 is turned on (if not already on), and may be used as a GPS to obtain geographic information on the remote unit's location. When a fish or other specimen is caught, the user may record the specimen data on the fish. For example, the species of the fish may be selected from the touch screen 40, and the fish hung on the scale 38 to measure its weight. The cable 32 may be drawn out, and the length of the fish measured (and entered manually if not electronically measured).

The processor may include software to assist the user at this point in deciding whether to keep a fish whose specimen data has been recorded. Data on a set of species may be permanently stored within the processor's memory, may be downloaded before the remote unit 10 is taken out to a location, for example from a personal computer through the data port 50, or may be received from a network server using the remote data exchange process described below. The stored data on the selected species is cross-referenced with the specimen data (e.g. the weight and length) to determine whether the fish is large enough to keep. The remote unit 10 may then warn the user that the specimen does not qualify as a keeper, whereupon the user may opt to abandon the data and cancel the remainder of the data recording process.

If the remote unit 10 indicates that the fish is acceptable (or the user opts to override the warning), the specimen data may be stored in memory. The processor may automatically store the time and date of the catch, the location of the unit, or the user may enter such information manually. The processor may obtain atmospheric conditions from the sensors 30, either automatically or at the user's command, which may be stored along with the corresponding specimen data. The probe 36 may be extended and directed into the body of water from which the fish was caught, and water condition data may be added to that already recorded. The processor may request the user to provide additional details, such as whether the specimen has a migratory tag, what the qualitative weather conditions are, and optionally may allow the user to input any additional personal notes or comments desired regarding the circumstances of the catch. This process may be repeated each time a fish is caught at the location, and the processor may cumulatively record and store the information in memory for later retrieval or transfer.

Alternatively, the remote unit 10 may be operated in a batch mode, allowing the user to input as much data as desired at one time. For example, if a user does not have time to enter data as each specimen is caught, the data may be recorded manually and input into the remote unit 10 at the end of a session, or the specimen data on all of the fish caught may be measured at one time.

In addition, a simpler embodiment of a remote unit may be used for such batch mode operations. For example, a unit without environmental sensors may be used if such environmental information may not be needed, or may be measured and entered manually. Alternatively, the unit may not have measuring devices for obtaining specimen data, and this information may be recorded and entered manually. Generally, however, an embodiment such as the remote unit 10 described above which includes all of the sensors described is preferred, as it allows direct data recording with the remote unit 10 with substantially little risk of data becoming lost or being recorded incorrectly.

Subsequent to storing data in the unit's memory at a remote location, the remote unit 10 may be used to transfer the data, for example, to a personal computer for creating a personal log of the user's ongoing fishing activities. A cable may be connected between the data port 50 on the remote unit 10 and a personal computer (not shown). The remote unit 10 may be directed to transfer the data to the personal computer, or the personal computer may include a processor to control the remote unit 10 and extract the data from its memory. The personal computer may store the data indefinitely in its memory to create a personal log for the user and/or may transfer the data to a network server comprising a centralized database, for example, using a modem connection. If desired, each remote unit 10 may be registered to a particular user or associated with a unique identification code to enable the network server and central database to track the activity of individual remote units 10. In such an embodiment, the remote units 10 may also be used to provide rescue personnel with the last known location of, for example, a fishing vessel or hunting group.

Figure 2A:
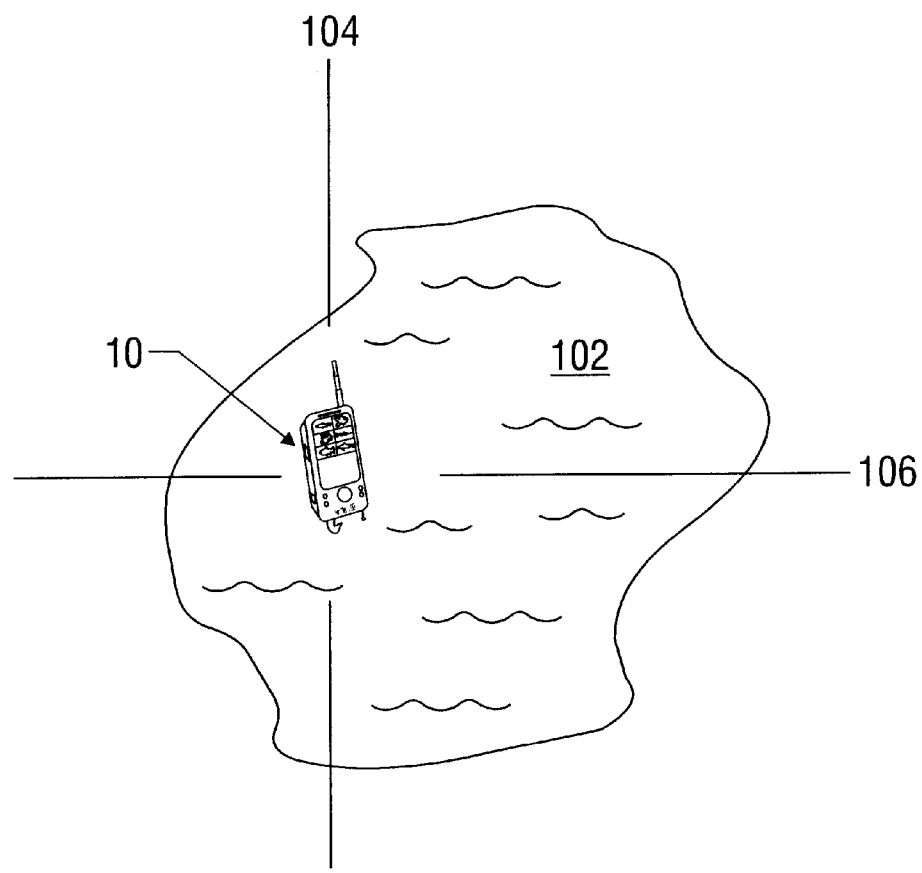
FIG. 2 is a schematic of a system for sharing information related to fishing conditions between a remote unit and a central network server.
Figure 2B:
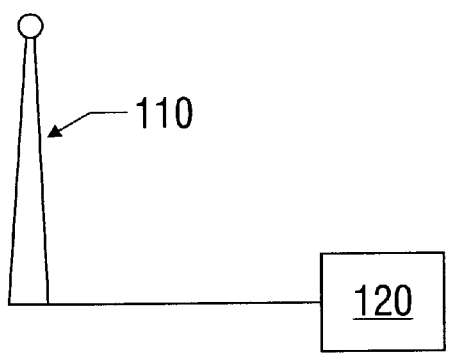

Alternatively, data may be transferred directly from the remote location to a network server comprising a central database compiled from such remote units, for subsequent use by other remote unit users and/or network subscribers. As shown in FIG. 2, a remote unit 10 may be taken to a remote location 100, such as on or adjacent a body of water 102 where the user is fishing or otherwise obtaining specimens. The transmitter/receiver of the remote unit 10 may be used as a GPS to provide the geographic location 100 of the remote unit 10, such as the longitude 104 and latitude 106. Environmental conditions, specimen data and other relevant information may be electronically recorded at the location 100 as desired, stored in the unit's memory, and prepared for transfer by the unit's processor. The remote unit 10 may send a signal to initiate contact with a base station 110, and may send a data signal 120 to the base station 110 that includes a summary of the data stored in the remote unit 10. The base station 110 may then relay the data to a network server 120 designed as a central repository for such data. For example, the remote unit 10 may communicate with the network server 120 using conventional cellular telecommunications.

The network server 120 includes processor circuitry (not shown) and memory circuitry (not shown) for collecting and storing data received from the remote unit 10 and other similar units, that is to create a database of retrievable information related to fishing conditions. The data from the data signal relayed through the base station 110 may be stored in the server's memory. The server's processor may add the data to a database of information previously received from other remote units and stored in the server's memory.

Remote unit users or subscribers authorized to access the database may contact the network server 120 to review data, for example in anticipation of a fishing trip to a selected location. The subscriber may select a location, the network server 120 may extract information on the selected location from the database, and the subscriber may review the data compiled regarding that location. In addition, statistics based upon the data stored in the server 120 may be used to track and/or manage migratory natural resources by providing sample data indicative of the number and location of the species comprising the resource at a given point in time or over a selected period of time.

Alternatively, a remote unit 10 may be used to access the database directly from a selected location, such as from the remote location where a user is fishing. The remote unit 10 may contact a base station 110, providing access to the network server 120. The remote unit 10 may send an inquiry signal, identifying a selected location, such as the unit's location (or optionally other locations if desired). The server 120 may then extract the previously compiled data for the selected location from the database, relay the data to the base station 110, which may then transmit a data signal to the remote unit 10. The remote unit 10 may store the data in its memory, and the user may then review the data on the selected location on the display screen 42, thereby allowing the user to make decisions about where to fish, what bait to use, whether existing weather conditions are suited for fishing, etc. based upon the information received.

Alternatively, if a user does not wish to share the data acquired using their remote unit, they may choose to store the data only in their personal log. As data is compiled in their log over time, the user may access the information at later dates to decide where to fish based on current weather conditions, what bait to use to increase success, etc.

The remote unit and database system described above may be particularly useful for recreational fishing enthusiasts. Such users may use the remote units to record and share information with each other to mutually improve their enjoyment and success. Professional and commercial users may also use the system to track the movement of fish, for example to predict the location of schools of fish in the open seas. Government agencies or conservation groups may use the system to monitor the migration and rate of removal of fish or other migratory natural resources, thus providing a more sophisticated method of resource management, particularly if tagging information is recorded by the remote units and included in the server's database.

In an alternative embodiment, the remote unit may be substantially permanently or removably mounted, for example, on a vessel to serve as a logging instrument of the vessel's fishing activities. The remote unit may include sensors and measuring devices similar to those described above, or may receive information from other existing systems on the vessel, such as a GPS system for providing the vessel's location. Passengers and/or crew on the vessel may record information on fish caught and/or may access the network server to review conditions in the area. In addition to information related to fishing conditions, the remote unit may be used as a vessel log for recording information on fuel usage, passengers on board, and the like.

In a further alternative embodiment, the remote unit and database system may be used to electronically record and/or exchange data related to other outdoor activities, such as hunting, bird watching, surfing and hiking. Environmental conditions may be recorded as game is hunted, or physical data on the game may be included if appropriate. An embodiment of a remote unit suitable for such use may include sensors for measuring weather conditions, a scale for weighing small game, and possibly a transmitter/receiver for exchanging relevant information with a central repository or server, as described above.

Finally, a remote unit 10 in accordance with the present invention may be provided with a docking station (not shown) that may be used to interface the remote unit 10 with, for example, a personal computer, or other equipment such as a sonar system, fish finder or depth finder.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method of exchanging information between a portable recording device and a central repository, said method comprising the steps of:

providing a portable recording device including an input mechanism, memory circuitry and a transmitter/receiver;

providing a central repository comprising memory circuitry, and processor circuitry for storing a database of relevant information on a variety of locations in the memory circuitry;

taking the portable recording device to a remote location;

electronically recording data at the remote location with the input mechanism of the portable recording device, said step of electronically recording data comprising the steps of:

catching a fish;

electronically recording physical data descriptive of the fish; and electronically recording data on environmental conditions at the remote location;

storing the data in the memory of the portable recording device;

sending a signal from the transmitter/receiver of the portable recording device, the signal comprising the data stored in the memory circuitry;

receiving the data comprising the signal at the central repository; and adding the data to the database of previously compiled information stored in the memory circuitry of the central repository.

2. The method of claim 1, wherein said step of electronically recording physical data comprises the steps of:

electronically measuring the weight of the fish; and measuring the length of the fish.

3. A method of electronically recording information related to fishing conditions at a remote location, said method comprising:

providing a remote fish logging device including an input mechanism and memory circuitry;

taking the remote fish logging device to a remote location;

electronically recording data related to fish caught at the remote location with the remote fish logging device; and transferring the recorded data to a mass memory storage device external of the remote fish logging device.

4. The method of claim 3, wherein said step of electronically recording data comprises the steps of:

electronically recording species data on the fish;

electronically measuring specimen data on the fish; and comparing the specimen data with species data stored in the memory circuitry of the remote fish logging device to decide whether to keep the fish.

5. The method of claim 4, wherein said step of electronically recording comprises the additional steps of:

electronically measuring data on environmental conditions at the location with the remote fish logging device; and storing the specimen and environmental data in the memory circuitry of the remote fish logging device.

6. The method of claim 3, wherein said transferring step comprises sending a signal from a transmitter in the remote fish logging unit, the signal comprising the data.

7. The method of claim 3, comprising the additional steps of:

transferring a request for data on fishing conditions for a selected location from the remote fish logging device to a network server;

extracting compiled data on fishing conditions for the selected location from a database stored in the network server; and transferring the compiled data to the remote fish logging device.

8. The method of claim 7, wherein said step of transferring a request comprises the step of sending an inquiry signal from a transmitter in the remote fish logging device, the inquiry signal comprising the selected location.

9. The method of claim 8, wherein said step of transferring the compiled data comprises the steps of:

sending a data signal from the network server, the data signal comprising the compiled data; and receiving the data signal with a receiver in the remote fish logging device.

\* \* \* \* \*